United States Patent
Hoogeboom et al.

(10) Patent No.: US 11,995,151 B2
(45) Date of Patent: *May 28, 2024

(54) IMAGE GENERATION MODEL BASED ON LOG-LIKELIHOOD

(71) Applicant: Robert Bosch GmbH, Stuttgart (DE)

(72) Inventors: Emiel Hoogeboom, Amsterdam (NL); Didrik Nielsen, København K (DK); Max Welling, Amsterdam (NL); Patrick Forre, Amsterdam (NL); Priyank Jaini, Amsterdam (NL); William Harris Beluch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 398 days.

This patent is subject to a terminal disclaimer.

(21) Appl. No.: 17/445,891

(22) Filed: Aug. 25, 2021

(65) Prior Publication Data
US 2022/0101050 A1 Mar. 31, 2022

(30) Foreign Application Priority Data
Sep. 29, 2020 (EP) .................................... 20199057

(51) Int. Cl.
*G06F 18/25* (2023.01)
*G06F 18/213* (2023.01)
(Continued)

(52) U.S. Cl.
CPC .......... *G06F 18/214* (2023.01); *G06F 18/213* (2023.01); *G06N 20/00* (2019.01)

(58) Field of Classification Search
CPC ...... G06F 18/214; G06F 18/213; G06F 18/25; G06N 20/00; G06V 10/774; G06V 10/80; G06V 20/56; G06V 10/764
See application file for complete search history.

(56) References Cited

U.S. PATENT DOCUMENTS

2014/0156231 A1* 6/2014 Guo .................... G06N 7/01
703/2
2014/0279777 A1* 9/2014 Cornebise .............. G06N 3/045
706/22
(Continued)

OTHER PUBLICATIONS

Kingma wt al., An Introduction to Variational Autoencoders, May 1, 2014 (Year: 2014).*
(Continued)

*Primary Examiner* — Amandeep Saini
*Assistant Examiner* — Mehrazul Islam
(74) *Attorney, Agent, or Firm* — NORTON ROSE FULBRIGHT US LLP; Gerard A. Messina

(57) ABSTRACT

A computer-implemented method of training an image generation model. The image generation model comprises an argmax transformation configured to compute a discrete index feature indicating an index of a feature of the continuous feature vector with an extreme value. The image generation model is trained using a log-likelihood optimization. This involves obtaining a value of the index feature for the training image, sampling values of the continuous feature vector given the value of the index feature according to a stochastic inverse transformation of the argmax transformation, and determining a likelihood contribution of the argmax transformation for the log-likelihood based on a probability that the stochastic inverse transformation generates the values of the continuous feature vector given the value of the index feature.

15 Claims, 10 Drawing Sheets

(51) Int. Cl.
*G06F 18/214* (2023.01)
*G06N 20/00* (2019.01)
*G06V 10/764* (2022.01)
*G06V 10/774* (2022.01)
*G06V 10/80* (2022.01)
*G06V 20/56* (2022.01)

(56) References Cited

U.S. PATENT DOCUMENTS

2017/0365038 A1* 12/2017 Denton ............... G06T 5/00
2019/0220737 A1 7/2019 Yao

OTHER PUBLICATIONS

Kingma, et al., "Auto-Encoding Variational Bayes," Cornell University Library, 2014, pp. 1-14.
Van Den Oord et al., "Conditional Image Generation With Pixelcnn Decoders," Cornell University, 2016, pp. 1-13.
Nielsen et al., "Survae Flows: Surjections to Bridge the Gap Between Vaes and Flows," 34th Conference on Neural Information Processing Systems (NEURIPS 2020), Vancouver, Canada , 2020, pp. 1-25. <https://arxiv.org/pdf/2007.02731.pdf> Downloaded Aug. 20, 2021.
Tran et al., "Discrete Flows: Invertible Generative Models of Discrete Data," Cornell University Library, 2019, pp. 1-11. <https://arxiv.org/abs/1905.10347.pdf> Downloaded Aug. 20, 2021.
Kingma et al., "Adam: A Method for Stochastic Optimization," Cornell University, 2017, pp. 1-15. <https://arxiv.org/pdf/1412.6980.pdf> Downloaded Aug. 20, 2021.
Gomez et al., "The Reversible Residual Network: Backpropagation Without Storing Activations," Cornell University, 2017, pp. 1-15. <https://arxiv.org/pdf/1707.04585.pdf> Downloaded Aug. 20, 2021.
Finzi et al., "Invertible Convolutional Networks," First Workshop on Invertible Neural Networks and Normalizing Flows (ICML), 2019, pp. 1-6. <https://invertibleworkshop.github.io/INNF_2019/accepted_papers/pdfs/INNF_2019_paper_26.pdf> Downloaded Aug. 20, 2021.

* cited by examiner

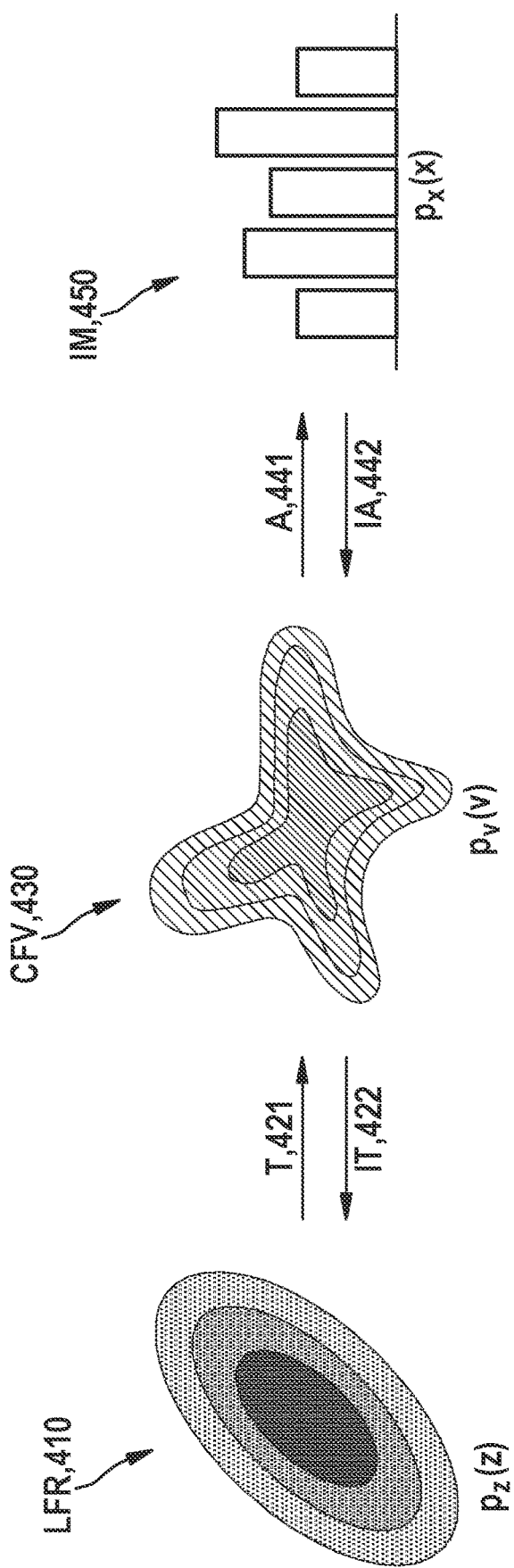

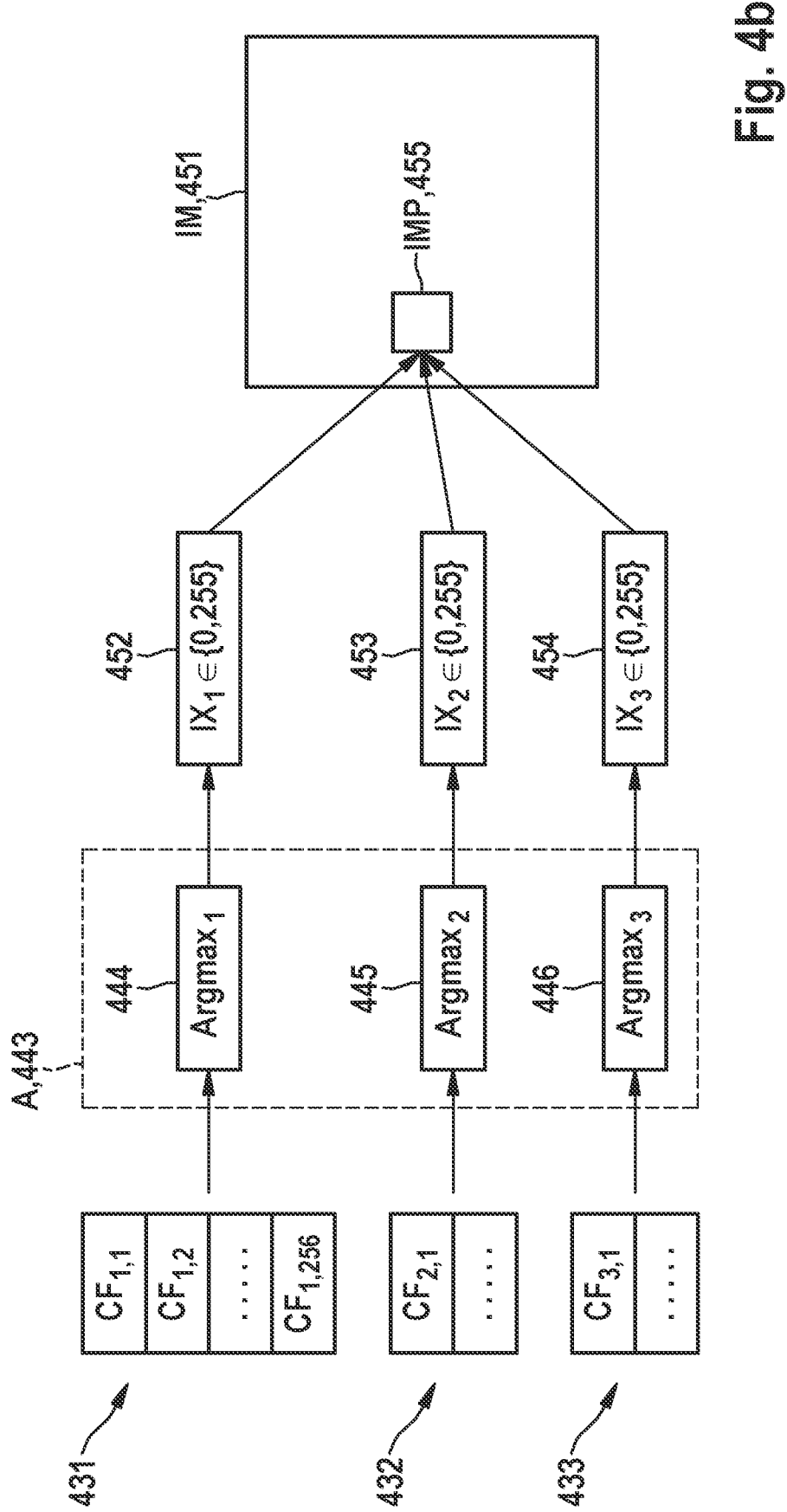

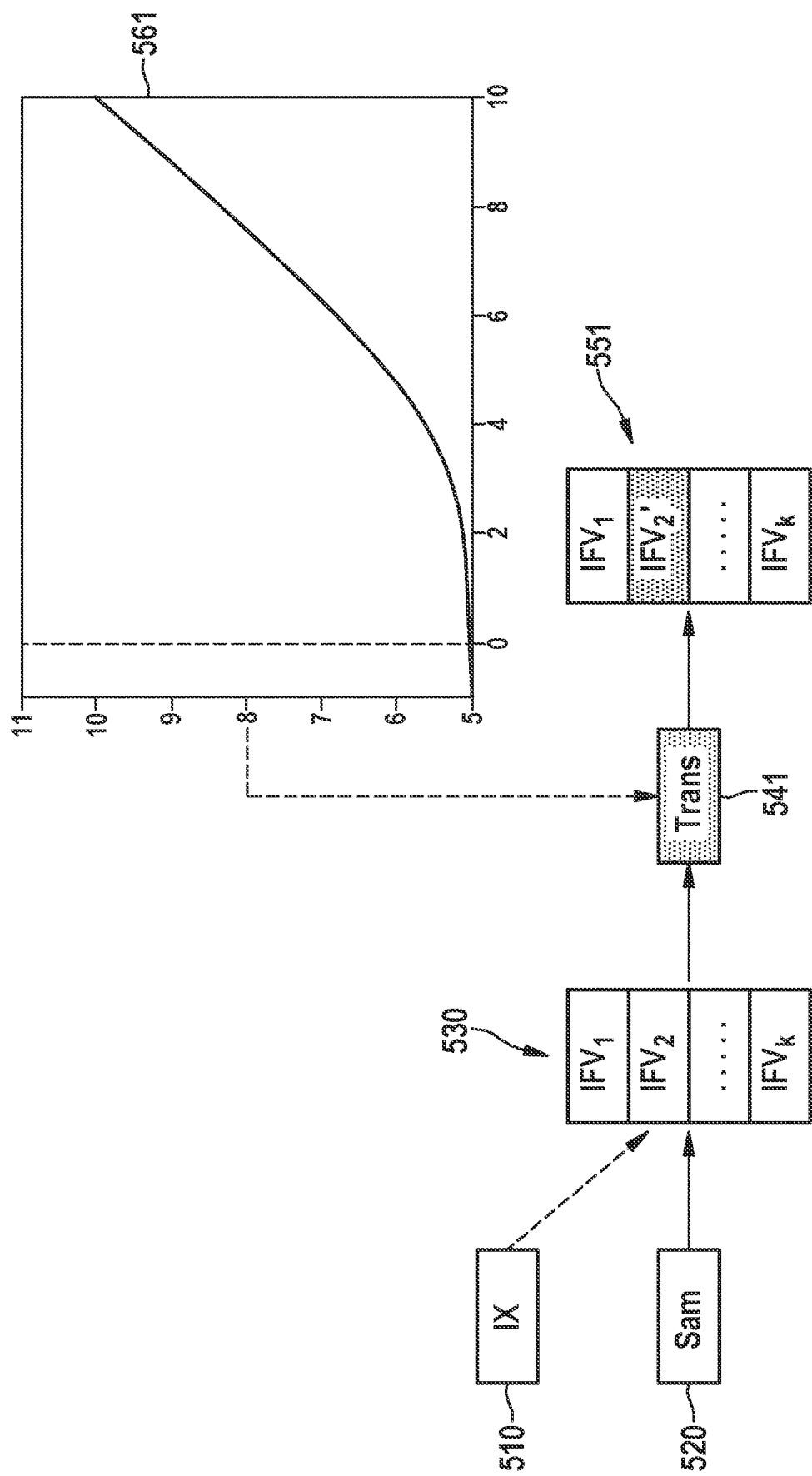

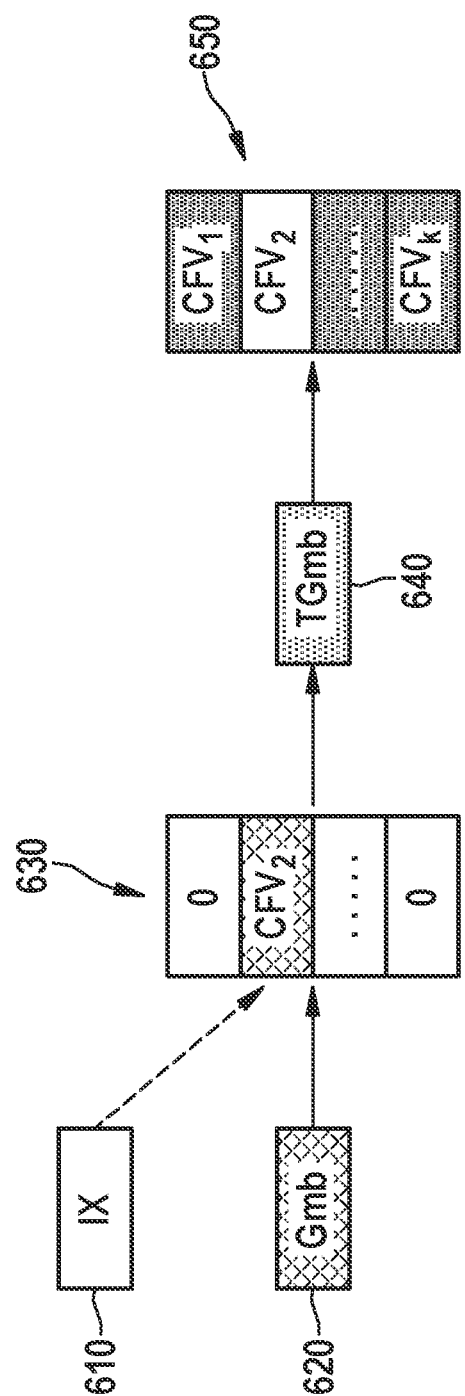

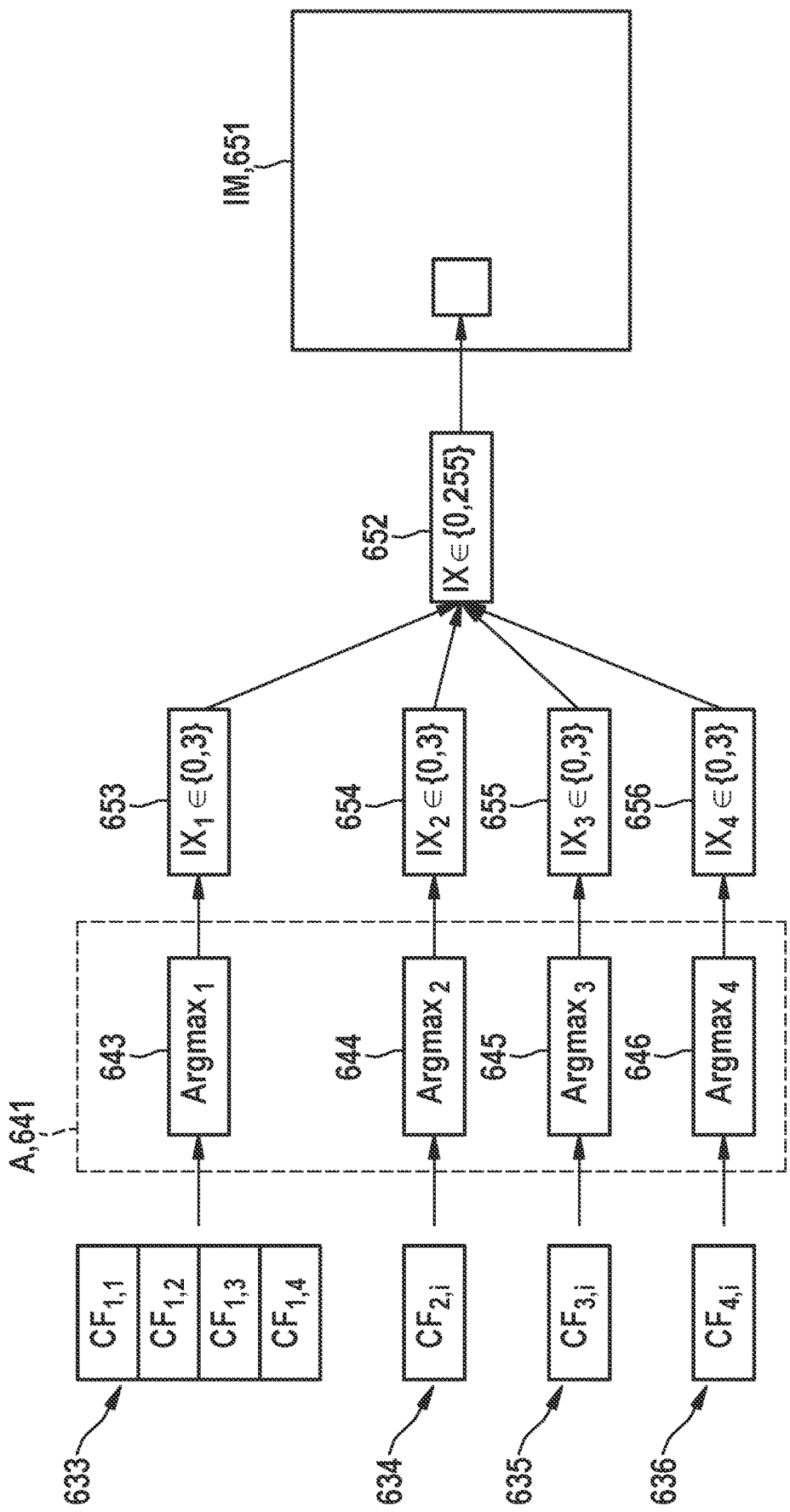

IMAGE GENERATION MODEL BASED ON LOG-LIKELIHOOD

CROSS REFERENCE

The present application claims the benefit under 35 U.S.C. § 119 of European Patent Application No. EP 20199057.9 filed on Sep. 29, 2020, which is expressly incorporated herein by reference in its entirety.

FIELD

The present invention relates to a computer-implemented method of training an image generation model, and to a corresponding system. The present invention further relates to a computer-implemented method of using such a trained image generation model to generate an image and/or obtain a conformance value of an image. The present invention further relates to a computer-readable medium.

BACKGROUND INFORMATION

For many real-world image processing tasks, machine learning is a promising technique. For example, in order to control a (semi-) autonomous vehicle based on image or video data of the environment in which it operates, image classification models (including semantic segmentation models and object detection models) may be used to analyse the image or video data, the result of which may then be used to control the vehicle (e.g., to perform braking in case a dangerous traffic situation is detected). By automatically learning how to best perform such tasks based on training data, as opposed to performing the tasks according to a manually specified algorithm, machine learning holds the promise providing better accuracy and adaptability to different settings. Other application areas of machine learning-based image processing include manufacturing (e.g., to detect errors in the manufacturing process) and medicine (e.g., to identify body parts or detect anomalies).

In practice, in many cases, the amount of available training data is a limiting factor for the accuracy that can be achieved by machine-learning based image processing. Especially in autonomous driving, but also in other application areas, a large number of training images with a high degree of variability are needed to get a sufficiently accurate model. This is especially true since, when using the output of a machine learning model to make decisions that affect the real world, the model needs to be very reliable and robust. At the same time, collecting real-world training data can be very expensive or even dangerous, e.g., when collecting data of dangerous traffic situations.

One way to deal with a lack of training data for training a machine learning model, is to train an image generation model. Given a training dataset, such an image generation model may generate synthetic images representative of the training dataset. These synthetic images may then be used to generate additional training data to train the machine learning model. An example of such an image generation model is a Variational Auto-Encoder (VAE), as described e.g. in D. Kingma and M. Welling, "Auto-Encoding Variational Bayes" (available at https://arxiv.org/abs/1312.6114 and incorporated herein by reference). In this model, an image is generated by choosing a latent feature representation, assumed to be distributed according to a prior distribution; and generating the image from the latent feature distribution according to a model. By adapting the latent feature representation, characteristics of the generated image can be manipulated. The model is trained in a log-likelihood optimization in which the probability of training images being generated according to the image generation model is maximized.

SUMMARY

One of the objects of the present invention is to provide an image generation model with improved quality of image generation, e.g., that generates images that are more representative of the training dataset. Another object is to provide training techniques that lead to such an improve image generation model. A specific object of the present invention is to train an image generation model in which less noise needs to be added to the generative process, while still generating images according to the model distribution that was originally specified and that the image generation model was optimized for.

In accordance with a first aspect of the present invention, a computer-implemented method and a corresponding system are provided for training an image generation model. In accordance with another aspect of the present invention, a computer-implemented method and a corresponding system are provided for using a trained image generation model. In accordance with an aspect of the present invention, a computer-readable medium is described.

Various embodiments of the present invention relate to an image generation model. The image generation model may be configured to generate an image from a latent feature representation by applying respective transformations to the latent feature representation. For example, the transformations may include one or more convolutional transformations and/or one or more normalization layers, e.g., one or more upconvolution transformations, interpolation transformations, batch normalization layers, etc. Many conventional architectures for generating images from latent feature representations are available and can be applied.

Typically, the image generation process involves the use of continuous latent feature vectors. For example, the latent feature representation may be modelled as being drawn from a continuous probability distribution, e.g., a normal distribution or the like. Thus, the latent feature representation may be a continuous feature vector. One or more transformations may be applied to this latent feature representation that are continuous as well. Generally, having continuous transformations is preferred since such transformations can be efficiently trained, e.g., using gradient descent or similar, and avoid performance problems known for discrete data, e.g., the occurrence of arbitrarily high likelihoods.

However, image data output by the image generation model is typically discrete. For example, the image may comprise one or more channels (often three, e.g., for RGB images). A pixel of the image may be described by discrete pixel values for the respective channels. For example, a pixel may be described by one or more respective 8-bit values for the respective channels.

Accordingly, in order to generate the output image data, at some point continuous features may be transformed into discrete features. The continuous features may be obtained by applying one or more transformations to the latent feature representation. The image data may be derived from the discrete features. For example, pixel values of the image may be equal to the discrete features, or may follow from the discrete features according to one or more fixed or trainable transformations.

Thus, in accordance with an example embodiment of the present invention, the image generation model may comprise a transformation that is configured to determine a discrete feature from a continuous feature vector. Interestingly, to perform this discretization, the inventors envisaged to use an argmax transformation. The argmax transformation may compute from the continuous feature vector a discrete index feature indicating an index of a feature of the continuous feature vector with an extreme value, e.g., an index of a maximum or minimum of the continuous feature vector. The argmax transformation may compute multiple respective discrete index features from respective (typically disjoint) continuous feature vectors. (Throughout this specification, the term "argmax transformation" is understood to include both transformations computing a maximum and transformations computing a minimum. The latter type may also be referred to more specifically as an "argmin transformation".)

The argmax transformation is a natural transformation to obtain categorical variables from continuous variables. This makes it easier for a machine learning model to learn how to best determine the continuous variables. Each continuous feature of the continuous feature vector may effectively indicate a correspondence of an input to the corresponding discrete output. Various machine learning techniques are well-equipped to learn such correspondences. At the same time, the inventors realized that an argmax transformation can also be effectively trained and used to compute conformance values, namely, by using a stochastic inverse transformation of the argmax transformation. Thus, the argmax transformation may be a so-called generative surjective transformation. Given an index feature, the stochastic inverse transformation may define a probability distribution of continuous feature vectors corresponding to the index feature.

Interestingly, the inverse transformation is typically parameterized by trainable parameters that are not used in the generative direction. For example, applying the argmax transformation in the generative direction may not use any trainable parameters at all. Even though such parameters may not be used when generating synthetic images, they still allow the model to be trained more accurately, and are also used when using the generative model to determine conformance.

As is conventional, the image generation model may be trained using a log-likelihood optimization. This may involve selecting a training image, and determining a log-likelihood of the training image being generated according to the image generation model. This is typically done by evaluating the generative model in the inverse direction (sometimes referred to as the inference direction), e.g., by applying inverses of respective transformations of the generative model. The log-likelihood may then be determined based on likelihood contributions of the respective transformations. The training may maximize the determined log-likelihoods with respect to the parameters of the model. In particular, the parameters of the inverse of the argmax transformation may thus be optimized.

Accordingly, during training the argmax transformation may be evaluated in the inverse direction by applying the inverse transformation to the value of the index feature, thus sampling values of the continuous feature vector. Based on the values of the index feature and of the continuous feature vector, a likelihood contribution of the argmax transformation for the log-likelihood may then be determined, based on a probability that the inverse transformation generates the values of the continuous feature vector given the value of the index feature.

The inventors realized that the use of an argmax transformation in the generative direction and a stochastic inverse in the reverse (inference) direction is a particularly good way of translating between continuous and discrete features. A discretization is provided with an efficiently computable stochastic inverse. The argmax transformation allows to map to obtain categorical variables from a continuous representation without adding uncorrelated noise to the sampling procedure. The inverse allows to efficiently learn its underlying density model. Thus, the image generation model can learn to generate discrete image data using a continuous image generation process in such a way that the underlying training images are more accurately reflected.

Interestingly, both the argmax transformation (in the generative direction) and its inverse (in the inference direction) may be efficiently implementable, in contrast, e.g., to autoregressive models and the like. Another advantage is that the argmax transformation may allow an exact likelihood estimation. This is particularly important when using the model to detect anomalies by flagging input data as anomalous if its calculated likelihood is below a certain threshold, as described further below.

Compared to directly optimizing a continuous transformation on discrete data, the techniques provided in accordance with the present invention may have the advantage that they avoid the arbitrarily high likelihoods that may be occur if the discretization is not explicitly modelled.

It is described in D. Nielsen et al., "SurVAE Flows: Surjections to Bridge the Gap between VAEs and Flows" (available at https://arxiv.org/abs/2007.02731 and incorporated herein by reference) to discretize data by rounding (also known as dequantization), and to provide a stochastic model of the inverse transformation. Even though rounding is a natural transformation to obtain ordinal discrete variables, it has the disadvantage that it places an unnatural inductive bias on categorical variables. An argmax transformation does not have this problem but still allows an efficient stochastic inverse transformation to be defined.

In VAE-type approaches, the decoder typically introduces uncorrelated noise to the output distribution. As an alternative to introducing uncorrelated noise, it is also conventional to apply heuristics to deterministically discretize data. However, applying such heuristics has the disadvantage that in this case, the models do not sample from the model distributions that was originally specified and optimized. Thus, the generated images have a bias and match the data less well. Interestingly, the provided techniques avoid the introduction of uncorrelated noise without using such heuristics.

Various aspects of the present invention relate to the use of a trained image generation model that includes an argmax transformation for discretizing a continuous feature vector into a discrete index vector. Such a trained image generation model may be beneficially applied in at least two ways. In some embodiments of the present invention, the image generation model may be applied to a latent feature representation to obtain a generated image. By using an image generation model trained as described herein, in comparison to other image generation models, a generated image may be obtained that better represents the training dataset.

In some embodiments of the present invention, the image generation model may be used by applying an inverse model for the image generation model to an input image to obtain a conformance value. The conformance value may indicate a conformance of the input image to the training dataset, e.g., in terms of a likelihood (e.g., log-likelihood) of the input image being generated according to the image generation model. The conformance value may be based on the inverse transformation of the argmax transformation, and in particular, may be based on a probability that the inverse transformation generates the values of the continuous feature vector given the value of the index feature. Because the same stochastic inverse of the argmax transformation is used as in training, the conformance value may more accurately indicate conformance.

Optionally, an index feature for an image may correspond to a particular pixel of the image. That is, the index feature affects that pixel but no other pixels. For example, each pixel may be determined from a respective set of index features (typically mutually disjoint), e.g., according to a predefined relation. The argmax transformation may for example determine respective pixel values of the image by computing respective index features, indicating indices in respective continuous feature vectors. For example, there may be one index feature for a pixel providing its greyscale pixel value (e.g., an 8-bit value); or there may be three index features for a pixel, providing pixel values for its respective colour channels (e.g., respective 8-bit values).

Thus, a set of argmax transformations may form the final learnable transformation applied in the image generation in the sense that no other learnable transformations are applied afterwards. This is not necessary, however. For example, there may be additional transformations acting on the discrete values, as is conventional; there may be multiple subsequent continuous-to-discrete and discrete-to-continuous transformations, etc. Also in such cases an argmax transformation as described herein allows to accurately and efficiently model the discretization both in the deterministic forward direction and in the stochastic inverse direction.

Optionally, in the stochastic inverse, the values of the continuous feature vector may be sampled by first sampling an initial feature vector (e.g., according to trainable parameters), and then applying an injective transformation to the initial feature vector based on the value of the index feature. The injective transformation may output values of the continuous feature vectors in such a way that the index feature indicates an index of a feature of the continuous feature vector with an extreme value (e.g., is maximal in case the argmax computes an index of a maximal element or is minimal in case the argmax computes an index of a minimal element).

Because the injective transformation is applied, the sampling of the initial feature vector does not need to enforce that the feature indicated by the index feature has an extreme value, allowing a wide range of stochastic models to be used, as appropriate for the application at hand. The injective transformation then takes care of enforcing that the indicated feature has the extreme value. For the injective transformation, a likelihood contribution may be efficiently and exactly computable, e.g., based on a Jacobian determinant. The injective transformation can for example be a predefined transformation, e.g., one that does not have trainable parameters, making it particularly efficient to deal with in the optimization.

Optionally, applying the injective transformation comprises applying a smooth thresholding function. A thresholding function is a function that guarantees that its argument does not exceed a certain value or that its argument does not reach a certain value. The thresholding function may be used to ensure that the feature indicated by the index feature is maximal (or minimal) by transforming this feature to make it larger (or smaller) than other features of the feature vector; by transforming other features to make them smaller (or larger) than this feature; or both. Various conventional thresholding functions can be used as described herein, e.g., a smooth approximation to a rectifier such as a softplus, a Noisy ReLU, etc.

Optionally, in the inverse, the values of the continuous feature vector may be sampled given the value of the index feature based on a Gumbel distribution (e.g., parameterized according to trainable parameters). As is conventional, a Gumbel distribution models the distribution of a maximum (or minimum) of a number of samples of a distribution. Accordingly, the value of the continuous feature vector indicated by the index feature, e.g., the extreme value, may be sampled according to a Gumbel distribution. Values of the continuous feature vector that are not indicated by the index feature may then be sampled according to a truncated Gumbel distribution based on this extreme value. This provides a way of implementing the stochastic inverse of the argmax transformation that is well-grounded in probability theory and also efficient to implement.

Optionally, the image generation model may be configured to determine a discrete feature by computing multiple respective discrete index features using the argmax transformation, and combining said multiple discrete index features. For example, instead of computing an argmax for a continuous feature vector of size $K_1 \cdot \ldots \cdot K_D$, it is possible to compute D respective argmaxes to continuous feature vectors of respective sizes $K_1, \ldots, K_D$. It is possible to choose all $K_i$ equal, but this is not needed. As a result of computing the D respective argmaxes, D respective index features may be obtained, each indicating an index out of $K_1, \ldots, K_D$ possible indices. These index features may then be considered as, or mapped to, a single discrete feature with $K_1 \cdot \ldots \cdot K_D$ possible values. By computing several argmaxes of respective feature vectors, fewer continuous features are needed overall, namely, $K_1 + \ldots + K_D$ instead of $K_1 \cdot \ldots \cdot K_D$. Thus, a more efficient discretization can be obtained in this way.

Optionally, an image classifier may be trained on the same training dataset as the image generation model. A conformance value computed for an input image using the image generation model, may then be used as a reliability measure of the image classifier for the input image. For example, based on the conformance value, it may be decided whether or not to apply the image classifier to the input image, e.g., only if the conformance value indicates sufficient reliability, e.g., exceeds a threshold. Or, if the conformance value does not indicate sufficient reliability, e.g., does not exceed a threshold, the image classifier may still be applied but its output may be flagged as potentially unreliable, for example to a user or to another system that uses the output of the classifier. In any case, the measures described herein allow to obtain a more accurate reliability estimate by virtue of the image generation model more accurately representing the training dataset.

Optionally, the input image is an image of an environment of a vehicle, for example an autonomous or semi-autonomous vehicle. The image may be obtained from a camera of the vehicle, and at least if the conformance value indicates a sufficient reliability of the image classifier for the input image, an output of the image classifier may be used to control the vehicle. For example, the output may be used only if it is considered sufficiently reliable; it may be assigned a higher weight or importance the more reliable it is considered to be; etc. For example, if the output is not sufficiently reliable, a fail-safe mode may be activated instead of relying on results of the image classifier, and/or the driver may be alerted, etc.

In vehicle control systems, there is a wide variety of situations that a vehicle may end up in, and significant difficulty and costs are involved in collecting training data of a sufficiently representative set of situations. Moreover, especially in non-standard situations, it is important for vehicle control systems to act reliably. Thus, for vehicle control systems, having an accurate reliability measure for an image classifier is of particular importance.

In accordance with example embodiments of the present invention, use of the provided techniques in other types of computer-controlled systems, in which the system is controlled based on the output of an image processing model, and in which a conformance value of the image generation model for an input image is used as a reliability measure of the image processing model for that input image, is envisaged as well. Such systems typically include one or more sensors to obtain measurements of the environment (in this case, e.g., including a camera), one or more actuators to perform actions that affect the environment, and a processor subsystem to determine the action based on the sensor measurements (in this case, e.g., using the output of the image processing model). Apart from a vehicle, such a computer-controlled system can be, e.g., a robot (e.g., under control of an external device or an embedded controller), a domestic appliance, a power tool, a manufacturing machine, a personal assistant, an access control system, a drone, a nanorobot, or a heating control system.

Generally, various types of image data can be used, e.g., video data, radar data, LiDAR data, ultrasonic data, motion data, and thermal images, for each of which a respective camera can be used to capture them.

Optionally, the image generation model may be used for training set augmentation, e.g., for training a task-specific deep neural network or other model. For example, the image generation model may be applied repeatedly to obtain multiple generated images. These multiple generated images may then be used as training data to train a further machine learning model. For example, the generated images may be used as unlabelled training data, or as labelled training data, e.g., by manually or automatically obtaining labels. Thus, the further machine learning model, e.g., an image classifier (object detection model, image segmentation model, etc.) or the like, may be trained with a larger training dataset, resulting in a more accurate model. As discussed, such a model may be used, e.g., in controlling a computer-controlled system such as a semi-autonomous or fully autonomous vehicle. Interestingly, because images are generated based on a latent feature representation, various aspects of the generated images may be controlled by controlling this representation, e.g., allowing to generate training data with a combination of aspects for which it may be hard to obtain real images.

Optionally, the image generation model may be used for data synthesis, e.g., to synthesize missing image data outside of the field of view of an image sensor of the system. The captured and synthesized image data together may be used, e.g., to control a computer-controlled system as described herein.

Optionally, the further machine learning model may be applied to an input instance to determine an output of the further machine learning model for that input instance. Because the further machine learning model is more accurate, also the output of the further machine learning model (e.g., classification, segmentation, etc.) may be more accurate and may thus be improved using the provided techniques.

It will be appreciated by those skilled in the art, in view of the disclosure herein, that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTIONS OF DRAWINGS

These and other aspects of the present invention are apparent from and will be elucidated with reference to the example embodiments of the present invention described hereinafter.

BRIEF DESCRIPTION OF THE DRAWINGS

FIG. 4a shows a detailed example of how to apply an image generation model or its inverse, in accordance with an example embodiment of the present invention.

FIG. 4b shows a detailed example of how to generate an image, in accordance with an example embodiment of the present invention.

FIG. 5b shows a detailed example of how to sample values of a continuous feature vector by applying an injective transformation, in this case, by making an indicated feature larger than other values of the feature vector, in accordance with an example embodiment of the present invention.

FIG. 6a shows a detailed example of how to sample values of a continuous feature vector using a Gumbel distribution, in accordance with an example embodiment of the present invention.

FIG. 6b shows a detailed example of determining a discrete feature based on multiple discrete index features, in accordance with an example embodiment of the present invention.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EXAMPLE EMBODIMENTS

Figure 1:
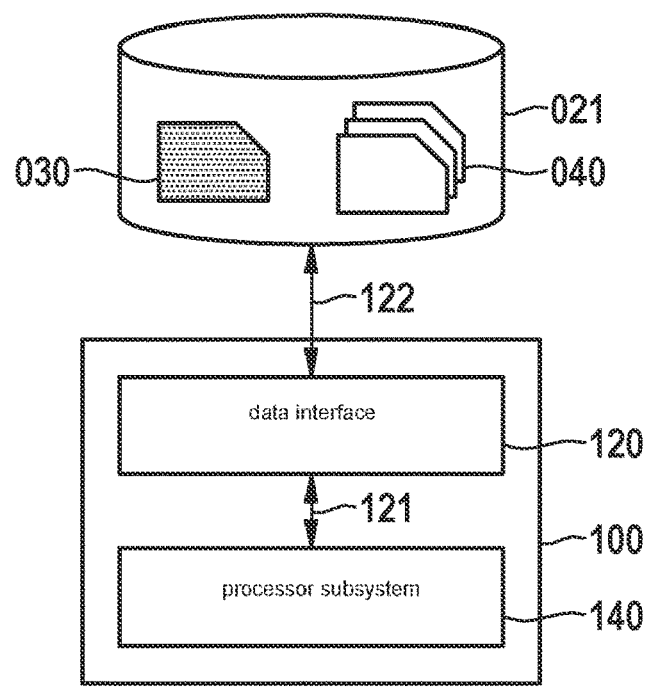
FIG. 1 shows a system for training an image generation model or using a trained image generation model for to generate an image, in accordance with an example embodiment of the present invention.

FIG. 1 shows a system 100. System 100 may be for training an image generation model and/or using the trained image generation model to generate synthetic images. The image generation model may be configured to generate an image from a latent feature representation. The image generation model may comprise a transformation configured to determine a discrete feature from a continuous feature vector. The transformation may be an argmax transformation configured to compute a discrete index feature indicating an index of a feature of the continuous feature vector with an extreme value.

The system 100 may comprise a data interface 120. Data interface 120 may be for accessing model data 030 representing parameters of the image generation model. In case training is performed, data interface 120 may also be for accessing training data 040 representing a training dataset of multiple training images; for example, at least 1000, at least 100000, or at least 1000000 training images. The training data may be unlabelled.

Figure 2:
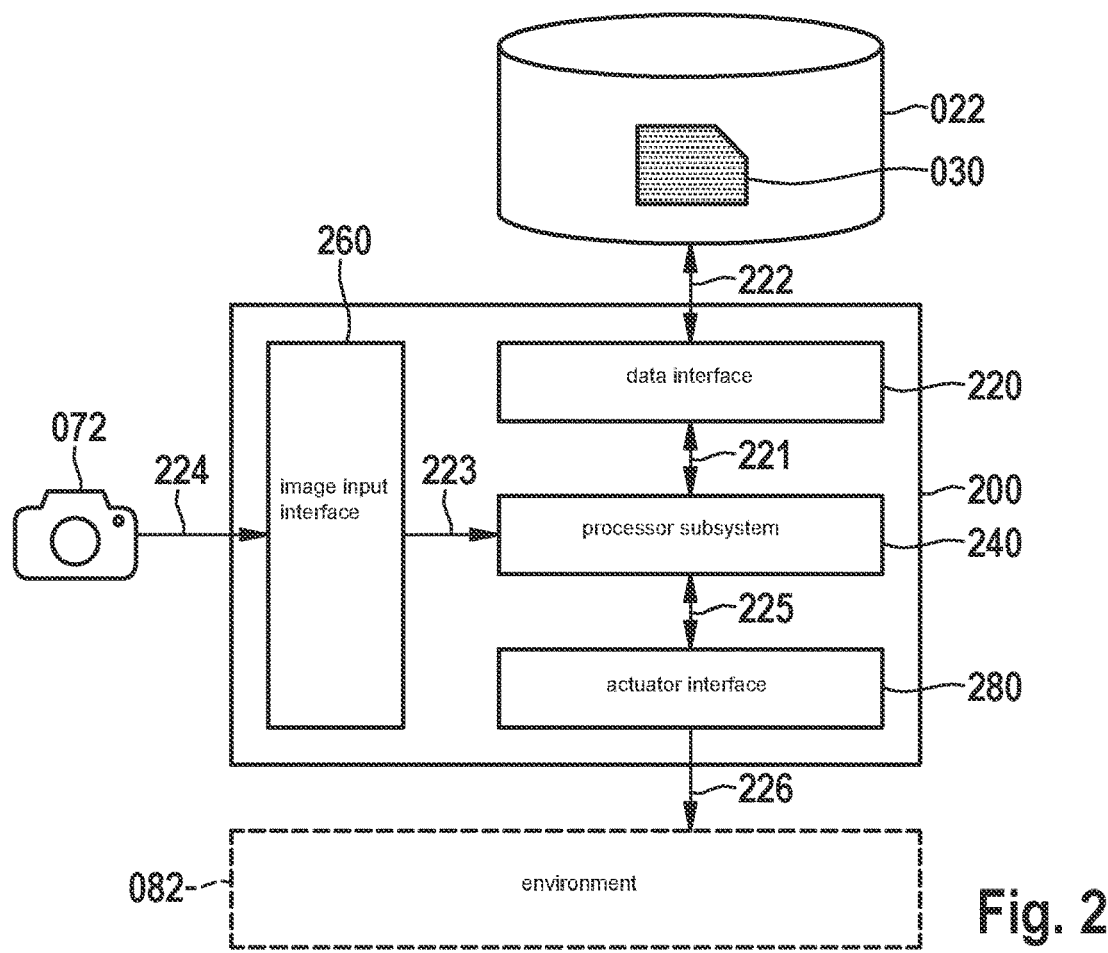
FIG. 2 shows a system for applying a trained image generation model to obtain a conformance value for an input image, in accordance with an example embodiment of the present invention.

System 100 may train and/or use the model, but the model data 030 can also be for use according to a method described herein, e.g., by system 200 of FIG. 2.

For example, as also illustrated in FIG. 1, the input interface may be constituted by a data storage interface 120, which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for the data storage interface 120.

The system 100 may further comprise a processor subsystem 140.

Processor subsystem 140 may be configured to, during operation of system 100, train the image generation model using a log-likelihood optimization. That is, parameters 030 of the model may be trained. The training may comprise selecting a training image, and determining a log-likelihood of the training image being generated according to the image generation model. Determining the log-likelihood may comprise obtaining a value of the index feature for the training image, sampling values of the continuous feature vector given the value of the index feature according to a stochastic inverse transformation of the argmax transformation, and determining a likelihood contribution for the argmax transformation based on a probability that the stochastic inverse transformation generates the values of the continuous feature vector given the value of the index feature. Processor subsystem 140 may further be configured to, during operation, output the trained image generation model.

Instead of or in addition to training the model, processor subsystem 140 may be configured to use the trained image generation model 030 (e.g., trained by system 100 or another entity) by applying the image generation model 030 to one or more respective latent feature representations to obtain respective generated images. The generated image(s) may be output as well.

The system 100 may further comprise an output interface. The output interface may be for outputting the trained image generation model, e.g., model data 030 and/or generated images. For example, as also illustrated in FIG. 1, the output interface may be constituted by the data interface 120, with said interface being in these embodiments an input/output ('IO') interface, via which e.g. the trained model data 030 may be stored in the data storage 021. For example, model data defining the 'untrained' model may during or after the training be replaced, at least in part, by model data of the trained model, in that the parameters of the model, such as weights and other types of parameters of neural networks, may be adapted to reflect the training on the training data 040. This is also illustrated in FIG. 1 by having the untrained and trained model data 040 coincide. In other embodiments, the trained model data may be stored separately from the model data defining the 'untrained' model. In some embodiments, the output interface may be separate from the data storage interface 120, but may in general be of a type as described above for the data storage interface 120.

FIG. 2 shows a system 200 for using a trained image generation model to determine conformance values.

The system 200 may comprise a data interface 220 for accessing model data 030 representing parameters of a trained image generation model. The image generation model may comprise a transformation configured to determine a discrete feature from a continuous feature vector. The transformation may be an argmax transformation configured to compute a discrete index feature indicating an index of a feature of the continuous feature vector with an extreme value. The image generation model may have been trained on a training dataset according to a computer-implemented method described herein, e.g., by system 100 of FIG. 1. An inverse of the argmax transformation may be approximated by a stochastic inverse transformation. In addition to applying the model 030 to determine conformance values, system 200 may also train the model 030 or use it to generate synthetic images, e.g., system 200 may be combined with the system of FIG. 1.

For example, as also illustrated in FIG. 2, the data interface 220 may be constituted by a data storage interface 220 which may access the model data 030 from a data storage 022. In general, the data interface 220 and the data storage 022 may be of a same type as described with reference to FIG. 1 for the data interface 120 and the data storage 021. Optionally, data interface may be for accessing input image(s) for which to determine conformance value(s).

The system 200 may further comprise a processor subsystem 240 which may be configured to, during operation of the system 200, use the image generation model to determine a conformance value indicating a conformance of the input image to the training dataset. The conformance value may be being based on a log-likelihood of the input image being generated according to the image generation model. The conformance value may be computed using the stochastic inverse transformation.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise an image input interface 260 for accessing image data 224 acquired by a camera 072. For example, the camera 072 may be arranged to capture images of a fibreoptic environment 082 of a computer-controlled system and can be arranged in or remotely from the environment 082. The camera 072 can but does not need to be part of the system 200. For example, the camera may be configured to capture image data, including lidar data, radar data, etc. The image input interface 260 may have any suitable form corresponding including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) in an environment 082 of a computer-controlled system. Such control data 226 may be generated by the processor subsystem 240 to control the actuator using conformance values of system 200, e.g., by using the conformance values as an indicator of a reliability of another machine learning model. Such control is described with reference to FIG. 3 for an (semi-) autonomous vehicle. The actuator can but does not have to be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on a determined conformance value. For example, an output of another machine learning model may be shown with the conformance value as an indicator of the reliability of the output; and/or the output may be shown conditionally on the conformance value indicating sufficient reliability.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of a vehicle, robot or similar physical entity, and/or may be represent a control system configured to control the physical entity.

Figure 3:
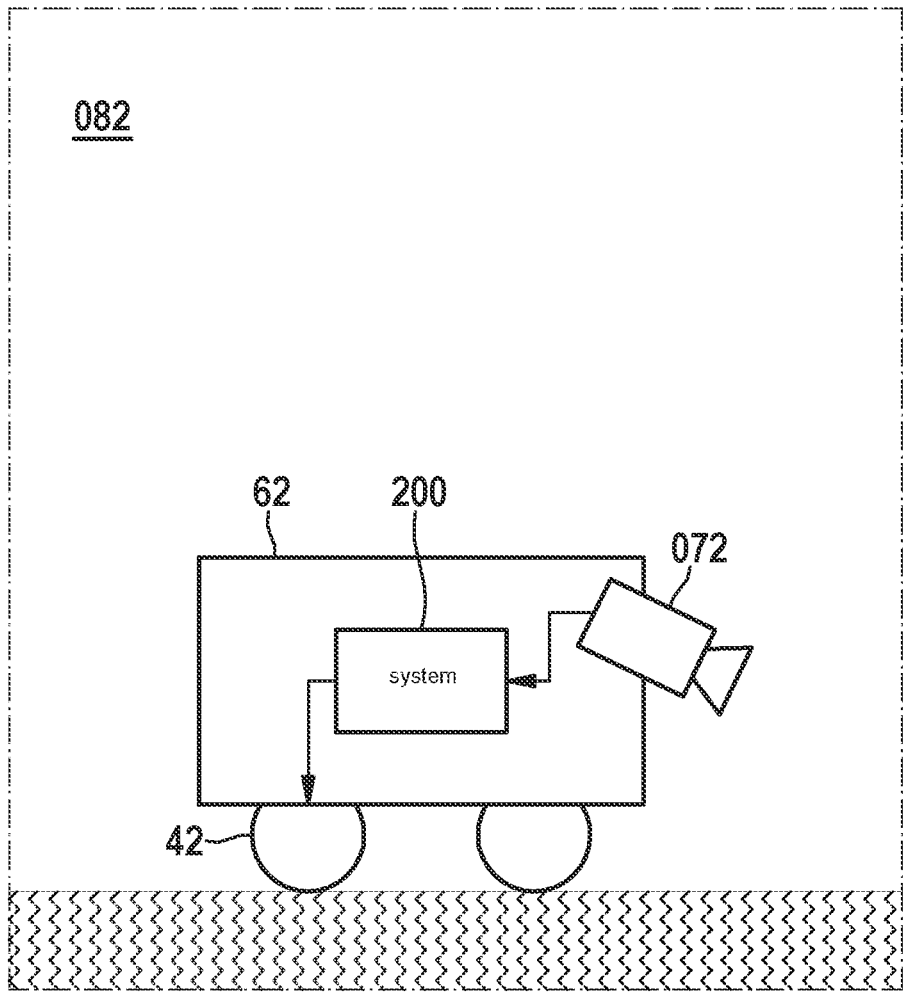
FIG. 3 shows a control system for a (semi-)autonomous vehicle that uses determined conformance value, in accordance with an example embodiment of the present invention.

FIG. 3 shows an example of the above, in that the system 200 is shown to be a control system of an (semi-)autonomous vehicle 62 operating in an environment 082. The autonomous vehicle 62 may be autonomous in that it may comprise an autonomous driving system or a driving assistant system, with the latter also being referred to as a semiautonomous system. The autonomous vehicle 62 may for example use conformance values determined by the system 200 in controlling the steering and/or the braking of the autonomous vehicle. For example, control system may be configured to access model data representing an image classifier trained on the same training dataset as the image generation model. Control system 200 may obtain an input image from camera 72 and use the image generation model to determine a conformance value. The conformance value may be used as a reliability measure of the image classifier.

At least if the conformance value indicates a sufficient reliability of the image classifier for the input image, the output of the image classifier may be used for controlling the vehicle. For example, the system may use the output of the image classifier for steering the wheels 42 of the vehicle, e.g., for keeping the vehicle in lane. If reliability is found to be insufficient, e.g., a driver may be alerted and the steering system, e.g., the lane-keeping system, may be deactivated or may be operated in a safe mode, etc.

FIG. 4a shows a detailed, yet non-limiting, example of how to apply an image generation model or its inverse.

Going from left to right, FIG. 4a shows a latent feature representation LFR, 410 being used to generate an image IM, 450. The latent feature representation LFR is typically a feature vector of continuous features. For example, the number of features may be at most or at least 50, at most or at least 100, or at most or at least 1000. The latent feature representation LFR may be modelled as being drawn from a continuous probability distribution, which may be denoted $p_Z(z)$. This distribution is sometimes referred to as the base distribution. For example, the distribution can be a standard Gaussian distribution, or the like.

As shown in the figure, the latent feature representation LFR may be transformed according to one or more transformations T, 421, of the image generation model to obtain one or more continuous feature vectors CFV. For example, one or multiple layers of transformations may be applied. Generally, the transformations T are continuous; they can be deterministic or stochastic. Accordingly, the transformations T may result in continuous feature vectors, and the probability distribution $p_Z(z)$ on latent feature representations LFR may induce a probability distribution $p_V(v)$ on the set of continuous feature vectors CFV. For example, transformations T may be specified by a normalizing flow, by a variational autoencoder (VAE) generator, by combinations of normalizing flows, variational autoencoders, etc. One, more, or all of the transformations T may have trainable parameters, trained as part of training the image generation model.

Given respective continuous feature vectors CFV, an argmax transformation A, 441, may be applied. The argmax transformation A may be configured to compute, given respective continuous feature vectors CFV, respective discrete index features. An index feature may indicate a feature of a respective continuous feature vector CFV with an extreme value, e.g., a maximum or minimum. The respective continuous feature vectors can all have the same length, but this is not needed. For example, a continuous feature vector can have length at most or at least 4, at most or at least 16, at most or at least 256. Accordingly, the continuous probability distribution $p_Z(z)$ of latent feature representations LFR may induce, via transformations T and argmax transformation A, a discrete probability distribution $p_X(x)$ on the discrete index features.

As a concrete example, argmax transformation A may apply the following (elementwise) argmax operation to compute extreme value (here, maximal) indices:

$$\text{argmax: } \mathbb{R}^{D \times K} \to \{1, \ldots, K\}^D, \quad (3)$$

$$(v_{d,k})_{d,k} \mapsto (\text{argmax}_{k \in \{1, \ldots, K\}}(v_{d,k}))_d$$

assigning for each dimension d separately the index $k_d$ such that $v_{d,k_d} \geq v_{d,k}$ for all k=1, ..., K. The corresponding categorical variable may be defined as x=argmaxv, where $x \in \{1, \ldots, K\}^D$.

In the example in this figure, computed index features correspond to pixels of the generated image IM, e.g., an index feature corresponds to a greyscale pixel value or value of a channel of the pixel according to a predefined relation. In particular, in this example, no transformations are applied to the discrete index features with learnable parameters. The number of computed index features may be equal to the number of pixels or the number of pixels times channels of the image, but this is not needed as explained elsewhere in this specification. For example, the number of computed index features may be at least 256, at least 1024, at least 1000000, etc.

Accordingly, generating an image IM may comprise sampling a new data point $x \sim P_X(x)$. This may be performed by sampling continuous feature vectors CFV, e.g., a datapoint $v \sim p_V(v)$, generally by sampling or otherwise selecting a latent feature representation LFR; and applying transformations T. Given datapoint v, the argmax transformation A may be applied, e.g., computing x=argmax v. The image data IM may follow from x according to a predefined transformation, e.g., a pixel value may be set equal to an index feature or several index features may correspond to a pixel value, the pixel value being computed by combining the index features.

Going from right to left, FIG. 4a shows how, given an image IM, a log-likelihood may be determined of image IM being generated according to the image generation model. The log-likelihood can be used to train the image generation model by maximizing the log-likelihood over a training dataset, e.g., using stochastic gradient descent or similar. Here, variational inference may be used to obtain a lower bound on a log-likelihood objective. The log-likelihood of a given image can also be used as a conformance value for that image, indicating a conformance of the image IM to the training dataset that was used to train the image generation model.

Generally, in order to compute the log-likelihood, a stochastic inverse transformation IA, 442, of the argmax transformation may be used. The stochastic inverse transformation is typically parameterized by trainable parameters of the image generation model, trained by the log-likelihood optimization. The inverse transformation IA typically uses respective sets of parameters to generate respective continuous feature vectors. However, it is also possible for a subset or all of the trained parameters to be partially or fully shared between the respective sub-calculations of the inverse transformation IA. Using separate parameters for separate index features is typically preferred, e.g., to allow to reflect the different roles of the corresponding pixels in the output image.

Given one or more index values x, the stochastic inverse transformation IA may define a probability distribution q(v|x) over continuous feature vectors CFV mapping to these given values. The inverse IA is chosen preferably such that, whenever q (v|x)≠0, e.g., for any continuous feature vectors CFV in the support of the probability distribution, the argmax transformation A maps these continuous feature vectors v back to the original index vectors x. (This property may also be slightly relaxed, e.g., by only considering probabilities q(v|x) above a certain threshold.) Several detailed examples of defining a stochastic inverse of the argmax transformation A are described herein.

Given the stochastic inverse transformation IA, a log-likelihood may be computed by obtaining values x of the index features, e.g., pixel values of the image IM or values derived from them. Given these values, continuous feature vectors v, CFV may be sampled according to the stochastic inverse transformation. A likelihood contribution of the argmax transformation A to this log-likelihood may then be determined based on the probability that the stochastic inverse generates values v given index features x, e.g., as log q(v|x). The likelihood contribution may be computed as disclosed more generally for generative surjections in EP 20183862.0 from Jul. 3, 2020 and in D. Nielsen et al., "SurVAE Flows: Surjections to Bridge the Gap between VAEs and Flows" (the computation of likelihood contributions as described in these references being incorporated herein by reference).

This likelihood contribution may then be combined with a log-likelihood of the continuous feature vectors CFV being generated according to transformations T to obtain the log-likelihood for the training image, e.g., log $p_X(x)$=log p(v)–log q(v|x). Determining the log-likelihood for the continuous feature vectors may be performed by applying a (deterministic or stochastic) inverse transformation IT, 422, of transformations T to obtain a latent feature representation LFR, and determining a probability of this latent feature representation be sampled according to a prior distribution of the latent feature representation LFR. For example, as also discussed in EP 20183862.0 from Jul. 3, 2020, a log-likelihood for a training image may be determined as a sum of likelihood contributions for respective transformations (the description of European Patent Application No. EP 20183862.0 concerning this aspect being incorporated herein by reference).

For example, starting from a latent continuous distribution $p_V(v)$ over the continuous feature vectors CFV, the induced discrete probability distribution $P_X(x)$ over index features may be represented mathematically as follows:

$$P(x) = \int P(x|v) p_V(v).$$

Here, $p_V(v)$ can be any distribution, e.g., a family of normalizing flow models. Interestingly, in this formula, P(x|v) denotes a Kronecker delta peak such that x~P(x|v) is equivalent to x=argmax v. Accordingly, P(x|v) may be regarded as partitioning the space for v given different values of x, where the argmax operator induces the partitions. The log-likelihood of a training image being generated according to the image generation model can be optimized using variational inference using:

$$\log P(x) \geq \mathbb{E}_{v \sim q(v|x)}[\log P(x|v) + \log p(v) - \log q(v|x)],$$

$$= \mathbb{E}_{v \sim q(v|x)}[\log p(v) - \log q(v|x)].$$

Here, as discussed, it is preferred that P(x|v)=1 for any v∼q(v|x), e.g. that an appropriate probabilistic right inverse of the argmax transformation is selected.

In an embodiment, the image generation model, including transformations T and argmax transformation A, may be a SurVAE flow, as described in D. Nielsen et al., "SurVAE Flows: Surjections to Bridge the Gap between VAEs and Flows" and in European Patent Application No. EP 20183862.0 from Jul. 3, 2020 (both descriptions of SurVAE flow models being incorporated herein by reference). Argmax transformation A may be a generative surjection. Transformations T may be defined as a SurVAE flow, e.g., including bijective transformations, generative surjective transformations, inference surjective transformations, and/or stochastic transformations, etc. Various combinations of transformations that can be used to define an image generation model will be envisaged by the skilled person; several beneficial examples are provided herein.

For example, one or more transformations T may be bijective transformations. A collection of such transformations is known as a normalizing flow. A normalizing flow is a particular example of a SurVAE flow; A normalizing flow can also be part of a SurVAE flow. Using such normalizing flows in the transformation T is advantageous because normalizing flows admit exact likelihood evaluation and can be evaluated efficiently both in the generative direction (from latent feature representation to image) and generative direction (from image to latent feature representation), allowing efficient optimization and sampling. Such a normalizing flow may be defined by an invertible function, preferably a diffeomorphism, based on a base distribution on its inputs. Let $z \in \mathbb{R}^d$ be a variable with a certain base distribution $p_Z(z)$, e.g., a standard Gaussian or similar when the normalizing flow is applied to the latent feature representation. Let $g: \mathbb{R}^d \to \mathbb{R}^d$ be an invertible function which maps each z to a unique output v and which has inverse $g^{-1}=f$. In such a case, likelihood $p_V(v)$ of the flow output z being generated may be computed using the change of variables formula:

$$p_V(v) = p_Z(z) \left| \frac{dz}{dv} \right|, \text{ where } z = f(v).$$

The generative model may also comprise at least one transformation that is stochastic in the generative direction, e.g., an inference surjective transformation or a stochastic transformation. Accordingly, transformation T may be stochastic as well.

Regardless of whether transformation T is deterministic or stochastic, typically the number of elements of the latent feature representation LFR is smaller than the number of elements of the continuous feature vectors CFV combined, e.g., smaller than the number of generated pixels, e.g., at most 20%, at most 10%, or even at most 1% of the number of pixels or pixel values of the image IM. For example, a latent feature representation LFR may be at most 50, at most 100, or at most 250 features. A generated image IM may have e.g., at least 10000, at least 100000 or at least 1000000 pixels.

Although in the example shown in this figure, no more trainable transformations are applied after applying argmax transformation A, this need not be true in general, for example, one or more additional discrete transformations may be applied to the index features to arrive at pixel values of generated image IM. For example, the discrete transformations may be defined and optimized as described in in D. Tran et al., "Discrete Flows: Invertible Generative Models of Discrete Data" (available at https://arxiv.org/abs/1905.10347 and incorporated herein by reference). It is also possible to apply an inference surjective SurVAE transformation to the index features, for example. Generally, an argmax transformation may be applied in an image generation model anywhere where a continuous feature vector needs to be transformed to a discrete feature.

FIG. 4b shows a detailed, yet non-limiting, example of how to use argmax transformations to generate an image. Specifically, this example shows an image generation model as described herein being applied to generate index features that correspond to particular pixels of the image being generated.

The figure shows an image IM, 451, being generated from a latent feature representation (not shown in the figure) by applying an image generation model as described herein, e.g. the image generation model of FIG. 4a. The image generation model comprises an argmax transformation configured to compute respective index features from respective continuous feature vectors. As demonstrated in this figure, one or more index features may correspond to a pixel of the image. Shown is an image pixel IMP, 455. The image IM in this case is a three-channel image, e.g., an RGB image, but this is not a limitation, e.g., the image can be a one-channel image (e.g., greyscale) or a four-channel image (e.g., CMYK or RGB with alpha channel). Accordingly, pixel IMP is described by a number of pixel values corresponding to the number of channels.

In this example, each pixel value of pixel IMP is determined from one index feature. Thus, as shown in the figure, image pixel IMP may correspond to index features IX1, 452; IX2, 453; and IX3, 454.

Index features IX1, IX2, IX3 in this example are determined using respective computations Argmax1, 444; Argmax2, 445; and Argmax3, 446, comprised in argmax transformation A, 443. Argmaxi may compute an index features IXi from a respective continuous feature vector CFi,j, 431-433. The number of possible values of the index feature may correspond to the number of elements of the corresponding continuous feature vector CFi,j. For example, as shown in the figure, the image can be an 8-bit image, meaning that the pixel values are 8 bits. Thus, the number of values of the index feature, and thus the size of the continuous feature vectors, may be 8 bits as well. Other sizes are possible as well, e.g., at most or at least 16 elements or at most or at least 64 elements per continuous feature vector.

Figure 5A:
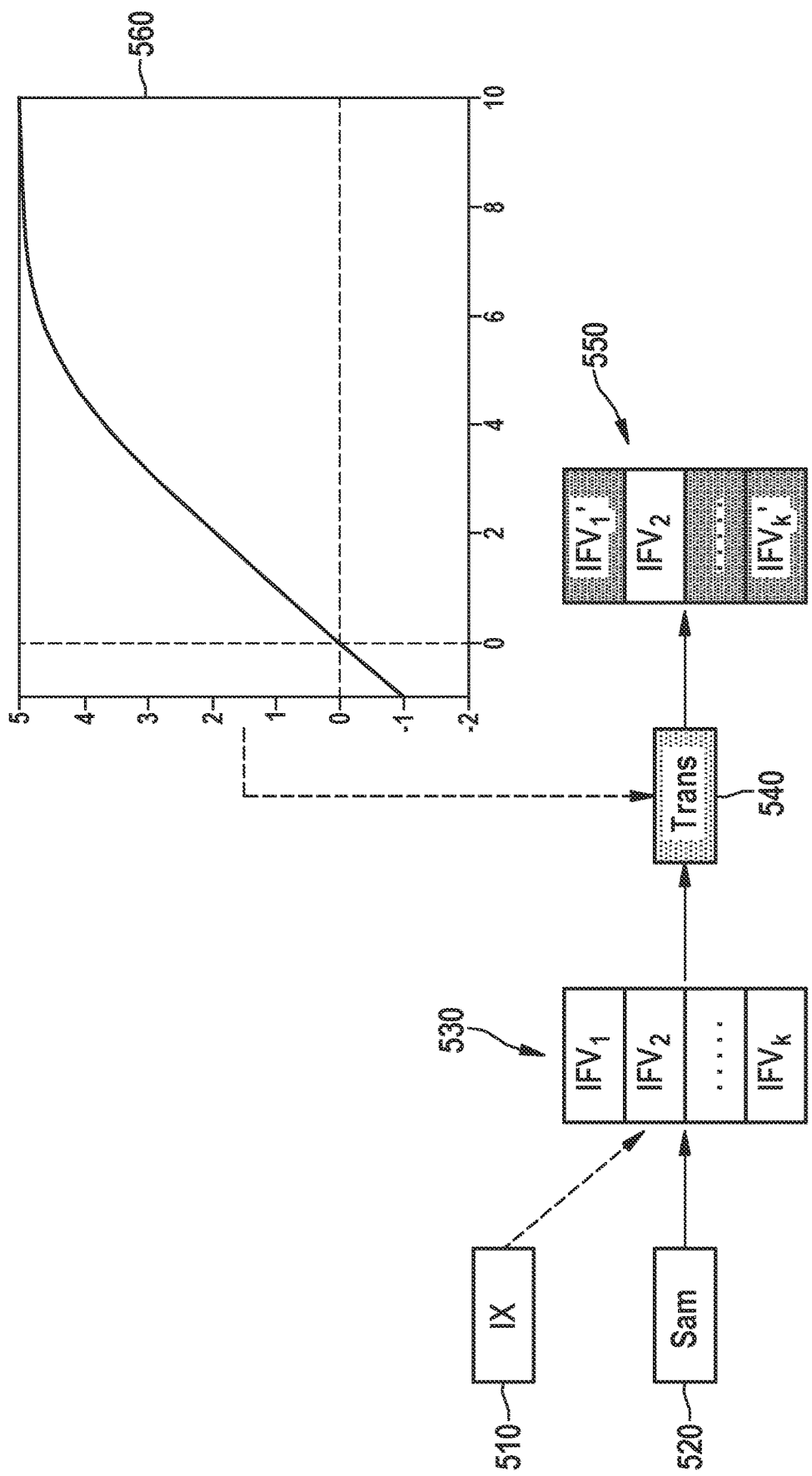
FIG. 5a shows a detailed example of how to sample values of a continuous feature vector by applying an injective transformation, in this case, by making other values of the feature vector smaller than an indicated feature, in accordance with an example embodiment of the present invention.

FIG. 5a shows a detailed, yet non-limiting, example of how a stochastic inverse of an argmax transformation can be implemented. In this example, the stochastic inverse transformation samples values of a continuous feature vector by applying an injective transformation. Specifically, other values of the feature vector are made smaller than an indicated feature. (As the skilled person understands, this example is easily adapted from an argmax function to an argmin function.) Shown in this example is an index feature IX, 510, indicating an index of a feature of a continuous feature vector. In this example, index feature IX indicates the second feature of the vector, as illustrated by the dotted line. The figure shows a single continuous feature vector being sampled from a single index feature, but as explained below, the inverse can act on multiple index features to generate multiple respective continuous feature vectors as well.

In order to sample a continuous feature vector such that the feature indicated by index feature IX is the largest, this example first uses a sampling operation Sam, 520, to sample an initial feature vector IFV1, ..., IFVk, 530. In this initial feature vector IVFi, the feature indicated by index feature IX is not necessarily the largest. Then, an injective transformation Trans, 540, is applied to elements of the initial feature vector IFVi to enforce that the feature indicated by the index feature IX is the largest. In this example, this is done by keeping the feature indicated by index IX constant but adapting each of the remaining elements of the initial feature vector IVFi to ensure that they are smaller.

Generally, sampling operation Sam can be any stochastic sampling procedure u~q(u|x) where u∈$\mathbb{R}^{D \times K}$. For example, the initial feature vector IVFi can be sampled according to a normal distribution or other probability distribution, e.g., parameterized by trainable parameters of the image generation model or by parameters that are derived from the index feature IX according to a trainable model. Sampling operation Sam can be a SurVAE flow. When generating multiple continuous feature vectors, typically, respective sets of parameters are used, that may however partially overlap.

Given initial feature vector IVFi, u~q(u|x), continuous feature vector v∈$\mathbb{R}^{D \times K}$, 550 may be computed according to an injective transformation outputting the continuous feature vector. It is beneficial to use an injective transformation since this allows the likelihood of q(v|x) to be computed efficiently, namely, based on q(u|k) and on the Jacobian determinant of the thresholding operation $$\left| \frac{dv}{du} \right|$$

using the change of variables formula known from normalizing flows. The injective transformation can be predefined, e.g., does not need to comprise trainable parameters. Accordingly, flexibility in sampling the initial feature vector IVFi can be combined with efficiency in ensuring that the maximal element is in the position indicated by index IX, while still, a continuous inverse transformation can be obtained.

As an injective transformation a smooth thresholding function, e.g., threshold: $\mathbb{R} \mapsto (-\infty, t)$, may be applied to elements of the initial feature vector IVFi not indicated by the index feature IX to guarantee that these values are mapped below a limit t, e.g., the maximal value. The figure shows a smooth thresholding function 560 obtained by modifying a softplus function:

threshold($u,t$)=−softplus(−($u-t$))+$t$.

Plot 560 shows an example of this function for threshold t=5. Instead of basing the smooth thresholding function on the softplus function it is also possible to base it on another smooth approximation to a rectifier, e.g., a Gaussian Error Linear Unit, a Noisy ReLU, a Leaky ReLU, an ELU, etc.

Accordingly, this function may be used to upper limit all values $u_x$, meaning the values of u except at indices x. The threshold values may be given by $u_x$, that is the values of u at the indices x. The thresholding may be represented mathematically as:

$v_x$=threshold($u_x, u_x$)

where for the remaining (maximal) indices, $v_x = u_x$. Since all values in the K axis are thresholded $u_x$ except for the values $u_x$, this method may be referred to as "all-but-one thresholding".

FIG. 5b shows a variant of the technique of FIG. 5a. Various options described with respect to that figure, also apply here, and, like FIG. 5a, the provided techniques can be adapted to compute an argmin instead of an argmax.

Like in FIG. 5a, an index feature IX, 510, is used, in a sampling operation Sam, 520, to sample an initial feature vector IVF1, ..., IVFk, 530.

Also similarly to FIG. 5a, an injective transformation Trans, 541, is applied to the initial feature vector IVFi to ensure that the element indicated by index IX is maximal. In this case, however, this is done by applying a smooth thresholding function to the element of the initial feature vector IVFi indicated by the index feature IX, while leaving the other elements of the initial feature vector IVFi unchanged.

For example, using the notation above, the values at $u_x$ may be up-thresholded to be larger than all other values $u_x$. To this end, a lower limit t=max$u_x$ may be computed over the category dimension, where t∈$\mathbb{R}^D$. In this case, values $v_x = u_x$ not indicated by index features IX may remain identical. Values indicated by index feature x may be updated using a smooth thresholding function, e.g., upthreshold: $\mathbb{R} \mapsto (t, \infty)$:

$v_x$=upthreshold($u_x, m$).

Similarly to FIG. 5a, various smooth thresholding functions may be used, such as a smooth approximation to a rectifier. For example, a softplus may be used, e.g., upthreshold may be defined as upthreshold(u,t)=softplus(u−t)+t where t is the threshold and u is the value to which the function is to be applied. A plot of this example function is shown as plot 561 in the figure, where threshold t=5 was chosen.

As a result of applying the smooth thresholding function, it may be ensured that values $v_x$ indicated by the index feature IX are higher than values not indicated by the index feature IX. Since only a single value per dimension is thresholded, this method may be referred to as "only-one thresholding".

As in FIG. 5a, the likelihood of the argmax transformation q(v|x) may be computed from thresholding the likelihood of the sampling operation Sam, q(u|x), and from the Jacobian determinant of the injective transformation Trans, $$\left| \frac{dv}{du} \right|,$$

using the change of variables formula.

It is also possible to combine the techniques of FIG. 5a and FIG. 5b, e.g., a smooth thresholding function can be applied to the feature of the continuous feature vector indicated by the index feature to make this feature larger (or smaller) than one or more values of the continuous feature vector. Then, a smooth thresholding function can be applied to threshold one or more other values of the continuous feature vector (for example, the remaining values) to make these other values smaller (or larger) than the feature indicated by the index feature. Also this ensures that the value indicated by the index feature is an extreme value of the continuous feature vector and provides the same advantages as the techniques of FIG. 5a and FIG. 5b separately.

FIG. 6a shows a detailed, yet non-limiting, example of how an inverse transformation of an argmax transformation can sample values of a continuous feature vector CFV1, ..., CFVk, 650, using a Gumbel distribution. In this example it is shown how to ensure that the value indicated by index feature IX, 610 (in this example: value CFV2) is maximal in the continuous feature vector CFVi. As the skilled person understands, the same techniques can be used to make the indicated value minimal as well.

For example, assuming a Gumbel distribution with location parameters $\phi$, and scale fixed to one, it may be noted that its values are distributed as follows:

$$v \sim \text{Gumbel}(\phi, 1)$$

Interestingly, as is conventional, for a Gumbel distribution, the argmax and max are independent distributions. Moreover, $\max_i v_i$ is distributed as a Gumbel distribution itself:

$$\max_i v_i \sim \text{Gumbel}(\phi_i, 1)$$

Accordingly, to obtain a sample CFV from the Gumbel distribution conditional on the index feature IX, x, first, a Gumbel sampling operation Gmb, 620 may be used. The Gumbel sampling operation may sample the value of the continuous feature vector indicated by the index feature IX, in this case feature value CFV2, according to a Gumbel distribution, e.g.:

$$v_x \text{Gumbel}(\phi_i, 1)$$

As a concrete example, to sample $g \sim \text{Gumbel}(\phi, 1)$, $u \sim \mathcal{U}(0,1)$ may be sampled, and from this, $g = -\log-\log(u) + \phi$ may be computed. The log-likelihood may be computed as $\log \text{Gumbel}(g|0,1) = \phi - g - \exp(\phi - g)$.

Given the argmax value CFV2, $v_x$, in a truncated Gumbel sampling operation TGmb, 640, values CFVi of the continuous feature vector that are not indicated by the index feature IX may be sampled according to a truncated Gumbel distribution, based on the sampled value CFV2, $v_x$, indicated by the index feature, e.g.:

$$v_j \sim \text{TruncGumbel}(\phi_1, 1; T), \text{ where } j \neq x,$$

where the truncation value T is given by $v_x$. The resulting variable v may then be sampled from the Gumbel($\phi_i$,1) given that x=argmax v.

The truncated Gumbel distribution is also known as the Gompertz distribution. As a concrete example, to sample $g \sim \text{TruncGumbel}(\phi,1;T)$, first $u \sim \mathcal{U}(0,1)$ may be sampled, and from that, $g = \phi - \log(\exp(\phi - T) - \log(u))$ may be computed. The log-likelihood may be computed as $\log \text{TruncGumbel}(g|\phi,1,T) = \exp(\phi-T) - \exp(\phi-g) + \phi - g$ under the condition that $g < T$.

In Gumbel sampling operation Gmb, the scale parameter is preferably set to one. The location parameter can be defined by one or more trainable model parameters, or can be determined from the index vector IX using a trainable (deterministic or stochastic) submodel of the image generation model, for example.

In truncated Gumbel sampling operation TGmb, the scale parameter is also preferably set to one. The parameters of the truncated Gumbel sampling operation TGmb are typically separate from those of the Gumbel sampling operation Gmb, but may, similar to those of the Gumbel sampling operation Gmb, be defined by model parameters or determined from the index IX using a trainable model.

FIG. 6*b* shows a detailed, yet non-limiting, example of determining a discrete feature by combining multiple index features.

Shown in the figure is an argmax transformation A, 641, that computes multiple respective index features IX1, 653; IX2, 654; IX3, 655; and IX4, 656. The index features are computed from respective continuous feature vectors CFV1, i, 633; CFV2,i, 634; CFV3,i, 635; and CF4,i, 636 by applying the argmax function Argmax1, 643; Argmax2, 644; Argmax3, 645; Argmax4, 646. For illustrative purposes, four index features are shown, but the number of index features can also be different, e.g., two, three, or at least five. For illustrative purposes, the first continuous feature vector CFV1,i is shown to comprise four features, but also this is not a limitation. The number of features per feature vector can be the same for each feature vector but can also differ per vector. The index features may also be computed by respective argmax transformations.

As the inventors realized, any C number of categories can be represented by $C = K^D$ when K are categories and D are dimensions. Accordingly, a discrete feature with C different values can be determined based on a continuous feature vector of length $K^D$, but also based on D continuous feature vectors of length K. More generally, C can be written as $K_1 \ldots, K_D$ and thus a discrete feature with C different values can be determined based on respective continuous feature vectors with lengths $K_1, \ldots, K_D$.

For example, the figure shows a discrete feature IX, 652, being determined by combining respective index features IX1, . . . , IX4. Generally, any bijection between the combination of values ($i_1, i_2, \ldots$) of the respective index features IXi and the discrete feature IX can be used. For example, the bijection defined by the Chinese remainder theorem can be used. Another example is the map $(i_1, i_2, \ldots) \mapsto (i_1 + K_1 i_2 + K_1 K_2 i_3 + \ldots)$. In the example shown, there are four index features, each of continuous feature vectors of length four. Thus, the index features IXi are two-bit values. The discrete feature IX is an 8-bit value. In this example but also more generally, the discrete feature may be obtained by concatenating the bitwise (or k-ary) representations of the index features, e.g., (2, 1, 0, 3)=($10_b$, $01_b, 00_b, 11_b) \mapsto 10010011_b = 147$.

Generally, when $K_1 + \ldots + K_D < K_1 \cdot \ldots \cdot K_D$, efficiency may be improved since fewer continuous feature vectors are needed. However, a certain degree of symmetry in the determined discrete feature IX is introduced. Thus, a trade-off between symmetry and number of dimensions may be obtained.

As illustrated in the figure, for example, discrete feature IX may determine a pixel value of the image IM, 651, generated by the image generation model. Thus, the index features IXi may correspond to this pixel. In this example, an 8-bit pixel value is thus determined by combining four 2-bit index features, thereby reducing the number of continuous feature vectors from 256 to 16. Similar advantages can also be attained using other numbers and lengths of continuous feature vectors.

The training may comprise optimizing an objective function that maximizes the log-likelihoods for the training images. Typically, training is performed using stochastic approaches such as stochastic gradient descent, e.g., using the Adam optimizer as described in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches of training images, e.g., of at most or at least 64 or at most or at least 256 images. More details concerning the training of SurVAE flow models are provided in European Patent Application No. EP 20183862.0 from Jul. 3, 2020 (incorporated herein by reference), the techniques of which can be used here as well.

Generally, the image generation model may be parameterized by a set of parameters. For example, the set of parameters may comprise weights of nodes of one or more neural networks of the image generation model and/or parameters of one or more probability distributions of the image generation model. For example, the number of parameters may be at least 1000, at least 10000, or at least 100000. In particular, as discussed, the parameters of the image generation model may comprise parameters of the argmax transformation, including parameters for evaluating it in the generative direction and/or parameters for evaluating it in the inverse (inference) direction. Depending on the particular application, various conventional architectures of the image generation model may be used. It is beneficial from the point of view of efficiency of training to use a model which is amenable to gradient-based optimization, e.g., which is continuous and/or differentiable in its set of parameters.

Several concrete examples are now given of image generation models that comprise an argmax transformation. As exemplified by FIG. 4a, generally, such an image generation model may use a set of one or more transformations to obtain continuous feature vectors from a latent feature representation, and may use one or more argmax transformations to determine a generated image from the continuous feature vectors.

In various embodiments, the set of transformations may be given by a SurVAE flow as described in D. Nielsen et al., "SurVAE Flows: Surjections to Bridge the Gap between VAEs and Flows". Additional details about SurVAE flows are provided in European Patent Application No. EP 20183862.0 from Jul. 3, 2020 (incorporated herein by reference). Various SurVAE flow transformations may be beneficially applied here, e.g., the image generation model may comprise one or more slicing transformations, maximum value transformations, rounding surjections, absolute value surjections, sort surjections, and/or stochastic permutations.

In some embodiments, one or more of the transformations apart from the argmax transformation may be implemented by a neural network, e.g., bijections and generative surjections may be used whose trainable parts are given by neural networks.

Generally, the image generation model may comprise one or more convolutional layers in which an input volume (e.g., of size m×n×c) is transformed by the layer to an output volume (e.g., of size m'×n'×c'), and in which a spatial correspondence between input and output volume is preserved. The output volume is typically larger or at least as large as the input volume. Such a layer may be implemented by one or more SurVAE flow transformations. An image generation model comprising such layers may be referred to as being a convolutional model. For example, the image generation model may be, apart from the argmax transformations, a convolutional neural network. The image generation model may for example comprise at most or at least 5, at most or at least 10, or at most or at least 50 convolutional layers.

For example, the image generation model may comprise a convolutional coupling transformation, as described in the SurVAE flow patent application. In an embodiment, the image generation model comprises a ReLU layer applying a ReLU transformation to respective parts of its input vector. In an embodiment, the image features generation model comprises an inverse of a max pooling layer that computes a maximum convolutionally to its input volume, thus upscaling the spatial dimensions of the input volume. In an embodiment, the image generation model comprises an inverse of a slicing transformation selecting a subset of channels, this increasing the number of channels.

The convolutional layers may be combined with one or more non-convolutional layers, for example, one or more densely connected layers. Such a densely connected layer may be implemented, for example, by combining a linear bijective transformation and a slicing transformation or its inverse. For example, the number of non-convolutional layers may be one, two, at most or at least 5, or at most or at least 10.

One possible architecture for the image generation model is now discussed.

Given a latent feature vector, first, an optional pre-processing part may be applied, e.g., involving one or more fully connected layers.

Then, a convolutional coupling transformation may be applied. This is a bijective transformation. As described in the SurVAE patent application, such a layer may compute first and second transformation output based on first and second transformation inputs by applying two transformations, e.g., as described in A. Gomez et al., "The Reversible Residual Network: Backpropagation Without Storing Activations" (available at https://arxiv.org/abs/1707.04585 and incorporated herein by reference). Both applied transformations are convolutions applied to their respective input volumes.

After the convolutional coupling transformation, in this example, a ReLU layer 542 is applied, as also described elsewhere. This is a generative surjective layer. Next, an inverse max pooling layer can be applied. This layer may perform upscaling by convolutionally applying an inverse of the max transformation across its input.

The convolutional coupling layer, ReLU layer, and inverse max pooling layer are convolutional layers determining respective output volumes from respective input volumes. These layers may be repeated multiple times, individually or in combination.

Finally, as described herein, one or more argmax transformations may be used to map an output volume to pixels of the generated image.

Many variations will be envisaged by the skilled person. In particular, the ReLU layer may be replaced by the "Sneaky ReLU" activation function by M. Finzi et al., "Invertible Convolutional Networks", proceedings First workshop on Invertible Neural Networks and Normalizing Flows at ICML 2019. Interestingly, this activation function is invertible and has closed-form inverse and log determinants.

Figure 7:
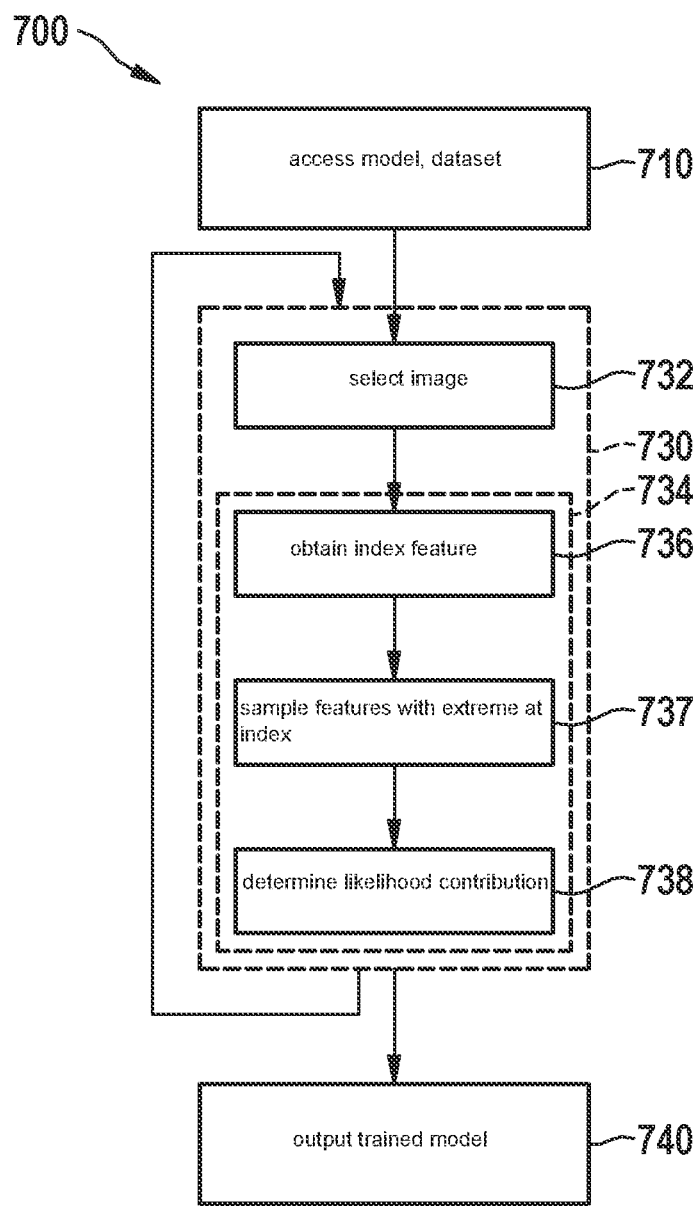
FIG. 7 shows a computer-implemented method of training an image generation model, in accordance with an example embodiment of the present invention.

FIG. 7 shows a block-diagram of computer-implemented method 700 of training an image generation model. The image generation model may be configured to generate an image from a latent feature representation. Method 700 may correspond to an operation of the system 100 of FIG. 1. However, this is not a limitation, in that the method 700 may also be performed using another system, apparatus or device.

The method 700 may comprise, in an operation titled "ACCESS MODEL, DATASET", accessing 710 model data representing parameters of the image generation model, and training data representing a training dataset of multiple training images.

The method 700 may comprise, in an operation titled "TRAIN MODEL", training 730 the image generation model using a log-likelihood optimization. Training operation 730 may comprise, in an operation titled "SELECT IMAGE", selecting 732 a training image. Training operation 730 may further comprise, in an operation titled "DETERMINE LOG-LIKELIHOOD", determining 734 a log-likelihood of the training image being generated according to the image generation model.

The image generation model may comprise a transformation configured to determine a discrete feature from a continuous feature vector. The transformation may be an argmax transformation configured to compute a discrete index feature indicating an index of a feature of the continuous feature vector with an extreme value.

The determining operation 734 may comprise, in an operation titled "OBTAIN INDEX FEATURE", obtaining 736 a value of the index feature for the training image. The determining operation 734 may comprise, in an operation titled "SAMPLE FEATURES WITH EXTREME AT INDEX", sampling 737 values of the continuous feature vector given the value of the index feature according to a stochastic inverse transformation of the argmax transformation. The determining operation may comprise, in an operation titled "DETERMINE LIKELIHOOD CONTRIBUTION", determining 738 a likelihood contribution of the argmax transformation for the log-likelihood based on a probability that the stochastic inverse transformation generates the values of the continuous feature vector given the value of the index feature.

The method 700 may comprise, in an operation titled "OUTPUT TRAINED MODEL", outputting 740 the trained image generation model.

Figure 8:
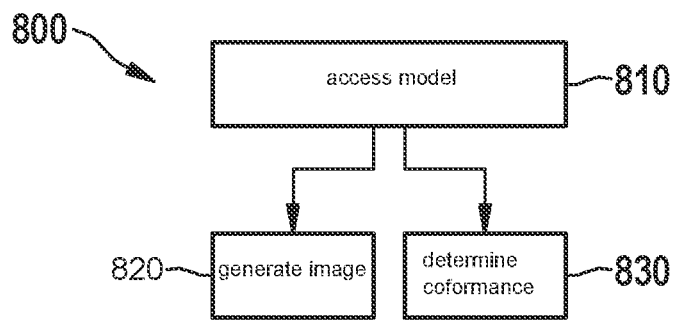
FIG. 8 shows a computer-implemented method of using a trained image generation model, in accordance with an example embodiment of the present invention.

FIG. 8 shows a block-diagram of a computer-implemented method 800 of Fins using a trained image generation model. Method 800 may correspond to an operation of the system 100 of FIG. 1 or the system 200 of FIG. 2. However, this is not a limitation, in that the method 800 may also be performed using another system, apparatus or device.

The method 800 may comprise, in an operation titled "ACCESS MODEL", accessing 810 model data representing parameters of an image generation model. The image generation model may comprise a transformation configured to determine a discrete feature from a continuous feature vector. The transformation may be an argmax transformation configured to compute a discrete index feature indicating an index of a feature of the continuous feature vector with an extreme value. The image generation model may have been trained on a training dataset according to a computer-implemented method described herein. An inverse of the argmax transformation may be approximated by a stochastic inverse transformation.

The method 800 may comprise, in an operation titled "GENERATE IMAGE", applying 820 the image generation model to a latent feature representation to obtain a generated image. Instead or in addition to operation 820, the method 800 may comprise, in an operation titled "DETERMINE CONFORMANCE", using 830 the image generation model to determine a conformance value indicating a conformance of the input image to the training dataset. The conformance value may be based on a log-likelihood of the input image being generated according to the image generation model. The conformance value may be computed using the stochastic inverse transformation.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations. Some or all of the methods may also be combined, e.g., method 800 of using the image generation model may be applied subsequently to this model being trained according to method 700.

Figure 9:
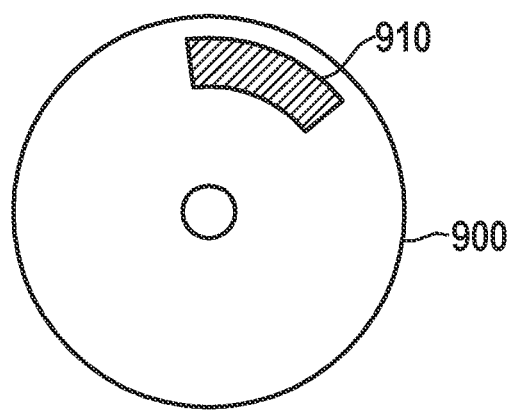
FIG. 9 shows a computer-readable medium comprising data, in accordance with an example embodiment of the present invention.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

FIG. 9 shows an optical disc 900. Alternatively, the computer readable medium 900 may comprise transitory or non-transitory data 910 being model data representing parameters of an image generation model trained according a computer-implemented method described herein.

It should be noted that the above-mentioned embodiments illustrate rather than limit the present invention, and that those skilled in the art will be able to design many alternative embodiments, in view of the present disclosure.

Herein, any reference signs placed between parentheses shall not be construed as limiting. Use of the verb "comprise" and its conjugations does not exclude the presence of elements or steps other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described separately does not indicate that a combination of these measures cannot be used to advantage.

What is claimed is:

1. A computer-implemented method of training an image generation model, the image generation model being configured to generate an image from a latent feature representation, the method comprising the following steps:

accessing model data representing parameters of the image generation model, and training data representing a training dataset of multiple training images;

training the image generation model using a log-likelihood optimization, wherein:

the training includes selecting a training image of the training images, and determining a log-likelihood of the training image being generated according to the image generation model, the image generation model includes a transformation configured to determine a discrete feature from a continuous feature vector, the transformation being an argmax transformation configured to compute a discrete index feature indicating an index of a feature of the continuous feature vector with an extreme value, and determining the log-likelihood includes obtaining a value of the index feature for the training image, sampling values of the continuous feature vector given the value of the index feature according to a stochastic inverse transformation of the argmax transformation, and determining a likelihood contribution of the argmax transformation for the log-likelihood based on a probability that the stochastic inverse transformation generates values of the continuous feature vector given the value of the index feature; and outputting the trained image generation model.

2. The method of claim 1, wherein the stochastic inverse transformation is parameterized by parameters included in the parameters of the image generation model.

3. The method of claim 2, wherein sampling the values of the continuous feature vector given the value of the index feature includes sampling an initial feature vector, and applying an injective transformation to the initial feature vector based on the value of the index feature to obtain the values of the continuous feature vectors, the injective transformation being defined such that the index feature indicates an index of a feature of the continuous feature vector with an extreme value.

4. The method of claim 3, wherein applying the injective transformation includes: (i) applying a smooth thresholding function to the feature of the continuous feature vector indicated by the index feature to make the feature indicated by the index feature larger or smaller than one or more values of the continuous feature vector, and/or (ii) applying a smooth thresholding function to one or more other values of the continuous feature vector to make the one or more other values smaller or larger than the feature indicated by the index feature.

5. The method of claim 2, wherein sampling the values of the continuous feature vector given the value of the index feature includes:
sampling the value of the continuous feature vector indicated by the index feature according to a Gumbel distribution; and
sampling a value of the continuous feature vector not indicated by the index feature according to a truncated Gumbel distribution based on the sampled value indicated by the index feature.

6. The method of claim 1, wherein the index feature corresponds to a particular pixel of the training image.

7. The method of claim 1, wherein the image generation model is configured to determine a discrete feature by computing multiple respective discrete index features using the argmax transformation and combining the multiple discrete index features.

8. A computer-implemented method of using a trained image generation model, comprising the following steps:
accessing model data representing parameters of an image generation model, the image generation model including a transformation configured to determine a discrete feature from a continuous feature vector, the transformation being an argmax transformation configured to compute a discrete index feature indicating an index of a feature of the continuous feature vector with an extreme value, the image generation model having been trained on a training dataset, an inverse of the argmax transformation being approximated by a stochastic inverse transformation; and
applying the image generation model to a latent feature representation to obtain a generated image, and/or using the image generation model to determine a conformance value indicating a conformance of an input image to the training dataset, the conformance value being based on a log-likelihood of the input image being generated according to the image generation model and being computed using the stochastic inverse transformation.

9. The method of claim 8, further comprising accessing model data representing an image classifier trained on the same training dataset as the image generation model, and using the conformance value as a reliability measure of the image classifier for the input image.

10. The method of claim 9, wherein the input image is an image of an environment of a computer-controlled system, the method further comprising obtaining the input image from a camera of the system and, at least if the conformance value indicates a sufficient reliability of the image classifier for the input image, using an output of the image classifier on the input image to control said system.

11. The method of claim 8, further comprising applying the image generation model repeatedly to obtain multiple generated images, and using the multiple generated images as training data to train a further machine learning model.

12. The method of claim 11, further comprising obtaining an input instance to the further machine learning model and applying the further machine learning model to the input instance to determine an output of the further machine learning model.

13. A system for training an image generation model, the image generation model being configured to generate an image from a latent feature representation, the system comprising:
a data interface configured to access model data representing parameters of the image generation model, and training data representing a training dataset of multiple training images; and
a processor subsystem configured to train the image generation model using a log-likelihood optimization and output the trained image generation model, wherein:
the training includes selecting a training image of the training images, and determining a log-likelihood of the training image being generated according to the image generation model,
the image generation model includes a transformation configured to determine a discrete feature from a continuous feature vector, the transformation being an argmax transformation configured to compute a discrete index feature indicating an index of a feature of the continuous feature vector with an extreme value, and
determining the log-likelihood includes obtaining a value of the index feature for the training image, sampling values of the continuous feature vector given the value of the index feature according to a stochastic inverse transformation of the argmax transformation, and determining a likelihood contribution for the argmax transformation based on a probability that the stochastic inverse transformation generates values of the continuous feature vector given the value of the index feature.

14. A system for using a trained image generation model, comprising:
a data interface configured to access model data representing parameters of an image generation model, the image generation model including a transformation configured to determine a discrete feature from a continuous feature vector, the transformation being an argmax transformation configured to compute a discrete index feature indicating an index of a feature of the continuous feature vector with an extreme value, the image generation model having been trained on a training dataset, an inverse of the argmax transformation being approximated in an inverse model of the image generation model by a stochastic inverse transformation; and a processor subsystem configured to apply the image generation model to a latent feature representation to obtain a generated image, and/or to use the image generation model to determine a conformance value indicating a conformance of an input image to the training dataset, the conformance value being based on a log-likelihood of the input image being generated according to the image generation model and being computed using the stochastic inverse transformation.

15. A non-transitory computer-readable medium on which is stored instructions for training an image generation model, the image generation model being configured to generate an image from a latent feature representation, the instructions, when executed by a computer, causing the computer to perform the following steps:

accessing model data representing parameters of the image generation model, and training data representing a training dataset of multiple training images;

training the image generation model using a log-likelihood optimization, wherein:

the training includes selecting a training image of the training images, and determining a log-likelihood of the training image being generated according to the image generation model, the image generation model includes a transformation configured to determine a discrete feature from a continuous feature vector, the transformation being an argmax transformation configured to compute a discrete index feature indicating an index of a feature of the continuous feature vector with an extreme value, and determining the log-likelihood includes obtaining a value of the index feature for the training image, sampling values of the continuous feature vector given the value of the index feature according to a stochastic inverse transformation of the argmax transformation, and determining a likelihood contribution of the argmax transformation for the log-likelihood based on a probability that the stochastic inverse transformation generates values of the continuous feature vector given the value of the index feature; and outputting the trained image generation model.

* * * * *